Oct. 18, 1932.  B. B. FORTNEY  1,883,360
HEADLIGHT
Original Filed Jan. 29, 1929

INVENTOR
Braddus B. Fortney.
BY
J. J. Basseches
his ATTORNEY

Patented Oct. 18, 1932

1,883,360

UNITED STATES PATENT OFFICE

BRAUDDUS BROCK FORTNEY, OF LOUISVILLE, KENTUCKY, ASSIGNOR, BY DIRECT AND MESNE ASSIGNMENTS, TO AMERICAN SAFETY HEADLIGHT CORPORATION, A CORPORATION OF DELAWARE

HEADLIGHT

Application filed January 29, 1929, Serial No. 335,876. Renewed June 20, 1931.

My invention relates to safety headlights.

It is an object of my invention to provide a safety headlamp which will fill all present requirements and specifications for illumination of the road, for spread and distance and avoid the objection of glare to approaching observers.

The present traffic law standards of headlight illumination have restricted the incandescent lamp or light source as one having a mean candlepower of 21, this low mean candlepower being so restricted due to the glare obtained in utilizing open face reflectors which are intended to salvage the light from the lamp from about a spheroid of reference. Reflectors of this general character include parabolic reflectors or the like which are intended to be associated with light spreading devices, such as prismatic lenses, to distort an otherwise cylindrical beam to distant points upon the roadway. Not only are these devices objectionable in that they operate within limited fields of candlepower, require expensive lenses and carefully adjusted lamps for spreading or distorting the cylindrical beam, but they project a beam of light which is uncontrolled, produces side scattering and frontal glare. The shortcomings, therefore, of present day types of headlights are restricted, by dispersed nonuniform illumination and the inherent blinding effects of frontal and side glare.

It is, therefore, an object of my invention to provide a headlight which has substantially no limit in illuminating capacity in that a source of light may be used of any desired candlepower and project the same upon the roadway for intense illumination along controlled paths below levels which will in any way interfere or blind an approaching observer, the device including condensing and reprojecting means for limiting the beam accurately below predetermined levels. It is a further object of my invention to provide a headlight which may have a light source of any desired intensity and project the same in a controlled beam below predetermined levels by an accurately and uniformly controlled reprojecting and focusing device, the visible outlet of the condensed beam being positioned to in no way be objectionable to the eye of an approaching driver on the road and having luminosity to be tolerable, with no glaring or blinding properties. It is contemplated by my invention to so uniformly condense, focus and reproject the light beam upon a roadway, either a highway or railway right of way, to obtain maximum intensity of illumination at great distances and to be free from uncontrolled side fringes of light tending to produce glare and blindness, and meet illumination specifications.

A still further object of my invention resides in providing a headlight for roadways in which the light is projected along the optical axis of the projecting device, characterized by utilizing the light rays below the optical axis from a condensed and controlled focal point and reflecting substantially all the projected light above the optical axis, the reprojected and rereflected portions serving to illuminate the object upon which it impinges in a manner to cause no preferential accommodation of the eye to nearby or distant objects.

Still further objects of my invention reside in the provision of a headlight of predetermined levels whereby fog blankets will be avoided in front of drivers of cars, as there will be no light emitted above the horizontal axis of the headlight.

Still further objects of my invention reside in the provision of a headlight which condenses by compound reflection the light from a source to economically illuminate by means of reprojection to the maximum degree and be free from blinding effects due to preferential accommodation of the eye during night driving, additionally preventing uncontrolled side glare, scintillating effects above predetermined levels of the roadway, as that of the eye of an approaching observer.

The invention still further contemplates a headlight which is simple and inexpensive to manufacture, characterized by including reflective surfaces easy to manufacture and focal and spread control lenses of simple design and construction.

To attain these objects and such further objects as may appear herein, or be hereinafter pointed out, I make reference to the accompanying drawing forming a part hereof, in which—

Figure 1:
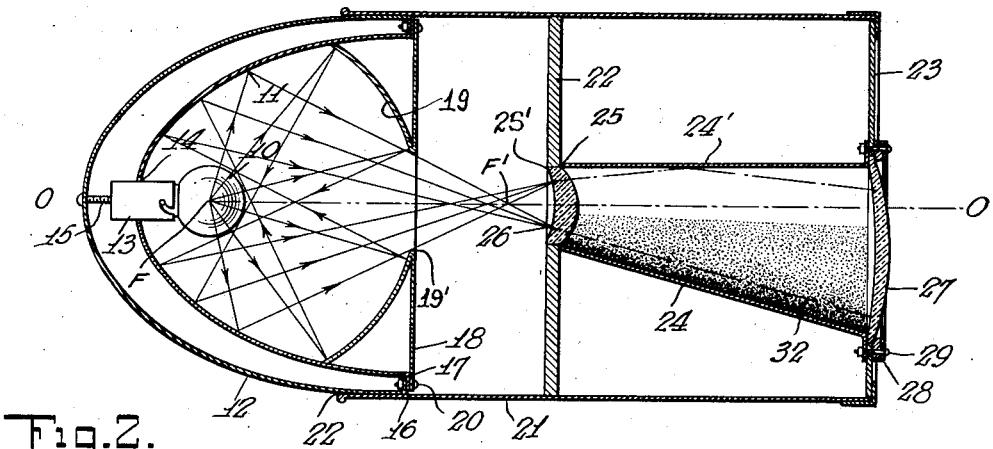
Figure 1 is a sectional view in side elevation of my device.
Figure 2:
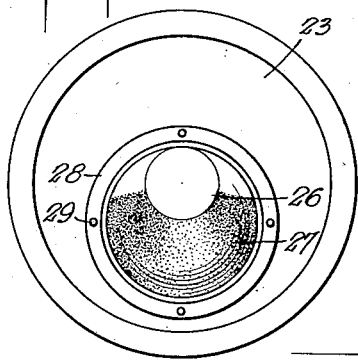
Figure 2 is a frontal aspect of the same, slightly reduced.
Figure 3:
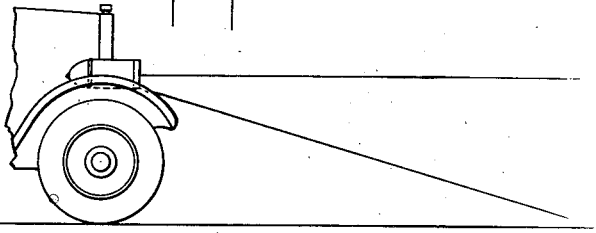
Figure 3 is a fragmentary diagrammatic view showing my device assembled in association with an automobile.

Making reference to the drawing, it will be observed that the headlight in accordance with my invention comprises a light source 10, in the form of an incandescent bulb, preferably including a condensed filament, a primary condensing reflector 11, serving to reflect and project a conical beam of light to a focus on the optical axis O—O. In the form illustrated the reflector 11 comprises a segment of an ellipsoid or distorted parabolic reflector, compounded by a segment of a sphere reflector apposed to the ellipse segment, to reflect or oscillate light rays upon the ellipse segment and may serve by combination to uniformly concentrate substantially all of light energy at a focus on the optical axis relatively close to the light source 10 within the headlight as shown at F'. It is preferred that the segment forming the conical beam in reflector 11, be an ellipsoidal reflecting surface and for this purpose a source of light 10 is positioned with the filament adjacent the primary focus F of the ellipsoidal segment. The spherical segment 19, is so apposed to the ellipsoidal segment that all light from the source 10 impinged upon spheroidal reflecting surface oscillates and is re-reflected within the conical beam converging substantially at F' upon the optical axis.

In Figure 1 the reflector 11 is mounted within the housing 12, provided with a bulb socket 13, passing through an orifice 14 capable of relative adjustment by the focus adjusting screw 15. The open end of the reflector 11 and the housing 12 are provided with outwardly and inwardly turned flanges 16 and 17, respectively, to which are also exteriorly attached the outwardly directed flange 18 of the spheroidal reflector 19, the parts being held in assembled relation by the bolts 20. Over the outer end of the housing 12 I may position in sliding relation a cylindrical housing 21, engaging the housing 12 at 22 by frictional and bayonet slot or screw engagement. The housing 21 is provided with a partition 22 and a forward end plate 23 serving to hold and mount the conduit 24, preferably disposed with the orifice 25 connecting with the partition 22 concentric with the optical axis O—O and eccentrically at the front plate 23 below the optical axis. Mounted within the orifice 25' of the partition 22, I provide a concavo-convex lens 26. The position of this concavo-convex lens along the optical axis is placed ahead of the inverted point F' of the rays condensed or converged and emanated from the system formed by the reflectors 11 and 19.

In this manner, the rays reflected from the primary reflector 11 will be converged upon the optical axis at approximately F' and diverge into lens 26 and reprojected upon the roadway through the secondary conic reflector 24 in a divergent beam. With a conic reflector so made by the concentric positioning in the rear partition 22, the lower edge of the conduit 24 diverges at substantially the same or slightly greater rate than the divergence of the beam coming through the lens 26, the portion of the conic reflector or conduit disposed above the optical axis O—O being substantially parallel thereto at 24' and is interiorly provided with a reflective surface. Below the optical axis, for a portion thereof, the conic control conduit is finished interiorly with substantially a mat surface 32, preferably by painting the same with white mat paint.

At the outer surface of end plate 23 there is positioned a lens 27, held to the end plate by the frame 28 and affixed by the bolts 29. The lens 27 is concavo-convex in form and is mutually in strength with inner lens 26 to give the desired spread upon the roadway.

By the construction shown, particularly where I have provided the primary reflector 11, the construction of which is such that all light projected from the primary reflector will converge in the form of a cone upon the optical axis at approximately F' and invert before emerging into lens 26. Light impinging upon the spherical reflector will be reflected upon the ellipsoidal segment and thence re-reflected within the conic beam and converged adjacent to the focus F' in front of the lens 26, emerging in a controlled divergent beam through the secondary control reflector, the divergence below the optical axis being of substantially the same angular displacement as the spread of the control conduit below the optical axis, to be substantially parallel thereto. Thus no reflection will be obtained from the surface of the control conduit 32 below the optical axis, which would cause upward glare by reflection. The slant and contour of the secondary reflector conduit above the optical axis is so chosen as to cause light impinged thereon from inner lens 26 to be reflected within and combined with the projected beam below the optical axis. This reflected light from the secondary reflector augments the illumination obtained from the reprojected beam below the optical axis, the re-reflected beam being directed within portions of the beam below the optical axis as to uniformly illuminate more distant objects and avoid preferential accommodation to the objects nearer the source of illumination.

Figure 4:
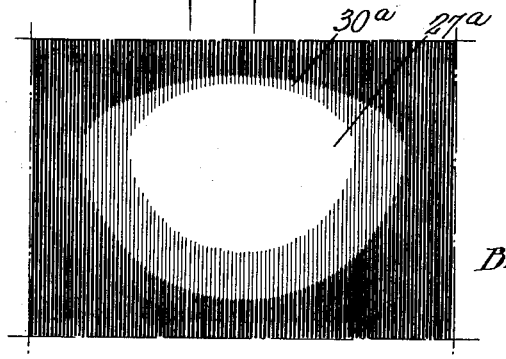
Figure 4 illustrates the illumination outline of a beam of light obtained with my device.

The character of the combined beams is more clearly illustrated in Figure 4 and the chart therein illustrated in which 27a is the portion illuminated by the combined rays emerging from below and above the optical axis, and the portion 30a is that illuminated by the rays emerging unchanged from the reflective system from above and below the optical axis. It is understood that the amount of the rays reflected from above the optical axis is apportioned to the amount emerging from the conduit below the optical axis as to obtain illumination in accordance with the outline of Figure 4. This character of light beam is calculated to avoid preferential accommodation of the eye to nearer more brightly illuminated objects and give substantially proper illumination to more distant objects. Thus, also, an approaching observer will accommodate his eye to the illumination derived from the rays projected by the lens 26, the conic secondary reflector and lens 27, without such preferential accommodation as may cause temporary blindness as the beam of light never inverts after emerging into lens 26, and is absolutely controlled below predetermined levels, such as the optical axis of the headlight, and as the converged point from the reflective system is only visible below the optical axis, with no upwardly reflected light from the conic control conduit, blindness, glare or sideway scintillation of light will be absolutely avoided.

All these factors permit the use of a high candle-power light source where desired to meet illumination specifications, and illuminate at great distances and at points closer to the headlight, or any desired characteristic illumination without the objectionable glare causing blindness to approaching observers.

For a further understanding of the features of my invention, it will be observed from Figure 1 that the combination includes the combined housing 12 and 21, supporting therein the primary compound condensing reflector; the adjustable socket and light source; the partition supporting control lens 26 and rear portion of the secondary conic reflecting conduit; the secondary conic reflecting control conduit; the frontal partition 23 supporting the forward portion of conic control reflector and beam converging lens 27. Preferably, in practice, the housing is constructed of light metallic substance. The primary compound reflector is the combination of a segment of an ellipsoid 11 and a segment of a sphere 19 determined by the circumference of the conic beam of light desired. The spheroidal segment is apposed in relation to the ellipsoidal segment to reflect the light rays adjacent to the source of light and slightly immediately forward thereof, and they are re-reflected from the ellipsoidal segment within the confines of the conic light beam converging adjacent the secondary focus point F' upon the optical axis. The resultant beam emerging from opening 19' is of the character resulting not only from direct projection, reflection from the ellipsoidal or concentrating reflector 11, but the re-reflection of the reflector 11 and the reflector 19 or repeated oscillations thereof due to the position of the reflector 19 whose center is just forward of the primary focus F of the reflector 11 at which point the light source is positioned. The light source is of the condensed filament type supported in a socket or receptacle which is adjustable relatively to the primary focus F of the ellipsoidal segment and the reflector along the optical axis.

The partition 22 has a small aperture concentric with the optical axis in which is placed the concavo-convex lens 26 forward of the focus F' and further supports the rear portion of the secondary control reflector. The concavo-convex lens 26 is constructed of focal length to control the reprojected light rays within the secondary reflecting conduit and is compatible with light beam converging lens 27; the secondary conic reflecting conduit is formed concentrically with the optical axis at the rear portion and forwardly is eccentric below the optical axis. The angular spread of the conduit at 24 below the optical axis is parallel to the rays of light below the horizontal plane and the contour of the conduit above the optical axis which is formed with a highly polished reflecting surface and its displacement at 24' is so chosen as to cause the diverging light impinged thereon to be reflected within the confines of the projected rays below the optical axis; the surface 32 below the optical axis is finished in white mat paint, there being no reflection from this point it serves to show the position of the vehicle. The frontal partition 23 forms part of the housing having reduced light emitting aperture eccentrically disposed to the optical axis in which is placed the lens 27. The lens 27 is constructed of focal length to control the characteristic road illumination desired and is compatible with lens 26.

In all, I have provided a headlight which is safe, providing the requisite amount of illumination for fast and safe night driving; economical to manufacture and operate.

Furthermore, by the position of the light source particularly between the primary reflector and the secondary reflector substantially the full spherical angle of light is under control and the beam emitted obscured by the lens 26 without any uncontrolled side glare from light emitted to the front of the light source. In addition, the features resulting permit of increased lens control without sacrificing illumination; in fact, there is control and increased illumination from standard low candle power lamps and control without blinding effect with higher candle power lamps, at the present time prohibited by the present standards and open face headlights.

Having thus described my invention and illustrated its use, what I claim as new and desire to secure by Letters Patent, is—

1. In a headlight, the combination which includes a primary compound condensing reflective system, including an ellipsoidal segment and a spheroidal segment, a source of light positioned at the inner focus of the ellipsoidal segment, said spheroidal segment having an emitting aperture, and a conically formed secondary reflector conduit having its small end concentric with the outer focus of the ellipsoidal segment and its forward end eccentrically disposed with said outer focus, said conduit having a reflector at its upper interior portion, and lenses placed near the inner and outer ends of said conduit reflector.

2. In a headlight, having a condensing reflective system arranged to converge the light from a source to a focal area within the headlight, of a conically formed secondary opaque conduit having its small end concentric with the optical axis of said reflecting system adjacent the focal area of said light and its forward end eccentrically disposed with the optical axis, to extend below the same, said conduit having a reflecting surface at its upper interior portion and lenses placed near the inner and outer ends of the conduit reflector.

3. In a headlight, the combination which includes a condensing reflective system arranged to converge the light from a source to a focal area within the headlight, a conically formed secondary reflector conduit having its small end concentric with the optical axis of said reflecting system adjacent the focal area of said light and its forward end eccentrically disposed with the optical axis, to extend below the same, said conduit having a reflecting surface at its upper interior portion and lenses placed near the inner and outer ends of the conduit reflector, the lens disposed at the inner end of the conduit being of a focal length to converge the inverted beam at substantially the same slope as the conical conduit below the optical axis.

4. In a headlight, the combination which includes a condensing reflective system arranged to converge the light from a source to a focal area within the headlight, the optical axis of the headlight being arranged to be disposed substantially parallel to the road surface, a conically formed secondary reflector conduit having its small end concentric with the optical axis of said reflecting system adjacent the focal area of said light of said system and its forward end eccentrically disposed with the optical axis, to have the opening thereof extend below the optical axis, said conduit having a reflecting surface at its upper interior portion, a concavo-convex lens placed near the inner end of the conduit reflector, to converge the light beam at substantially the same angular rate as the conical conduit below the optical axis, said conical conduit below the optical axis being formed with a non-reflective surface.

5. In a headlight, the combination with a projection system converging the light from a source to a focal area within the headlight, of a conically formed reflector conduit having its small end concentric with the optical axis of said system adjacent the focal area of said light and its forward end eccentrically disposed with the optical axis to extend below the same, said conduit having a reflecting surface at its upper interior portion, and lenses placed near the inner and outer ends of the conduit reflector.

6. In a headlight, the combination with a projection system having a converging light system with the converging point adjacent a focal area within the headlight, a conically formed reflector conduit having its small end concentric with the optical axis of said system adjacent the focal area and its forward end eccentrically disposed with the optical axis, to extend below the same, said conduit having a reflecting surface at its upper interior portion, and lenses placed near the inner and outer ends of said conduit reflector, the reflecting surface of said conduit being positioned in relation to the optical axis for emitting substantially the entire illumination eccentric to the optical axis.

In witness whereof I have hereunto signed my name this 29th day of Dec., 1928.

BRAUDDUS BROCK FORTNEY.